United States Patent
McKeon et al.

(10) Patent No.: US 7,607,110 B2
(45) Date of Patent: Oct. 20, 2009

(54) ELEMENT PERSISTENT IDENTIFICATION

(75) Inventors: Brendan McKeon, Seattle, WA (US); Peter Kam-Ho Wong, Mercer Island, WA (US); Susan Strom, Sammamish, WA (US); Robert E. Sinclair, II, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 725 days.

(21) Appl. No.: 10/692,923

(22) Filed: Oct. 23, 2003

(65) Prior Publication Data

US 2005/0091510 A1 Apr. 28, 2005

(51) Int. Cl.
G06F 3/048 (2006.01)
G06F 17/00 (2006.01)

(52) U.S. Cl. .................. 715/854; 715/764; 715/853; 715/968; 707/100; 707/102

(58) Field of Classification Search .............. 715/764, 715/853, 854, 968; 707/100, 102
See application file for complete search history.

(56) References Cited

U.S. PATENT DOCUMENTS

| | | | | |
|---|---|---|---|---|
| 5,327,529 A * | 7/1994 | Fults et al. | .............. | 715/762 |
| 5,642,511 A * | 6/1997 | Chow et al. | .............. | 717/105 |
| 5,864,819 A * | 1/1999 | De Armas et al. | .......... | 704/275 |
| 6,513,155 B1 * | 1/2003 | Alexander et al. | ......... | 717/124 |
| 6,754,890 B1 * | 6/2004 | Berry et al. | .............. | 717/128 |
| 2003/0063120 A1 * | 4/2003 | Wong et al. | .............. | 345/746 |
| 2004/0070612 A1 * | 4/2004 | Sinclair et al. | ............ | 345/762 |
| 2005/0050011 A1 * | 3/2005 | Van Der Linden et al. | ...... | 707/3 |

OTHER PUBLICATIONS

W3C XML Path Language Version 1.0, Nov. 16, 1999.*
Mir Farooq Ali et al. "Using task models to generate multi-platform user interfaces while ensuring usability", 2002.*
Mir Farooq Ali et al. "Building multi-platform user interfaces with UIML" 2002 as sited by above NPL.*
"DOI Handbook Introduction," http://www.doi.org/handbook_2000/intro.html, International DOI Foundation 2003, pp. 1-16, visited on Oct. 23, 2003.
"Searching for a Window," http://msdn.microsoft.com/library/default.asp?url=/library/en-us/vcug98/html/_asug_searching_for_a_window.asp, Microsoft Corporation 2003, p. 1, visited on Oct. 23, 2003.
"User Interface Markup Language(UIML) Draft Specification," http://www.uiml.org/specs/docs/uiml20-17Jan00.pdf (visited Feb. 26, 2009), Version 17, Jan. 2000, 64 pages.

* cited by examiner

Primary Examiner—Kieu Vu
Assistant Examiner—Haoshian Shih
(74) Attorney, Agent, or Firm—Klarquist Sparkman, LLP

(57) ABSTRACT

Identifier information is generated for a user interface element of interest within a user interface of a computer program based on a description of a hierarchical element path comprising, e.g., some combination of parent elements that the user interface element inherits from, class names of user interface elements, module names of application programs in the element path, and sibling order information. Process identifiers may also be added to distinguish between user interface elements of two different process instances of the same program. Unlike more fragile identifiers, such an element path identifier persists across instances of the computer program, across different computers, across different builds of the program, etc. Converting between a user-defined data type and a string type and vice versa also is provided.

23 Claims, 14 Drawing Sheets

ELEMENT PERSISTENT IDENTIFICATION

TECHNICAL FIELD

The technical field relates to graphical user interface components of a computer program. More particularly, the field relates to computer implemented methods and systems for identifying elements or components of a graphical user interface system of a computer program.

BACKGROUND

A typical mechanism for implementing user interaction with a computer may involve the use of a graphical user interface (GUI) associated with a computer program running on the computer. Generally speaking, user interface elements (hereafter, UI elements) are aspects of a computer system or program which may be seen (or heard or otherwise perceived or interacted with) by an end user and used to control the operation of a computer system or program through commands and other mechanisms. A graphical user interface emphasizes the use of graphical UI elements which are responsive to user input (e.g., mouse events, keyboard data entry etc.) for interacting with a computer system or program. Common UI elements familiar to most users include, buttons (e.g., "OK" or "Cancel), edit boxes, list boxes, combo boxes, scroll bars, pick lists, pushbuttons, radio buttons and components of World Wide Web pages (e.g., hyper-links, documents and images).

In a typical computer program it is not uncommon to encounter literally thousands of such UI elements. Also, some of the same UI elements may appear multiple times as part of different composite UI elements depending on a current context of the program's use. Also, the same UI elements may appear in other computer programs as well. Nevertheless, each instance of a UI element may need to be uniquely identified for various reasons such as programming the functionality of the program hosting such UI elements, testing such a program or for use in otherwise identifying the particular UI element to another program module in communication with the host program. For instance, Assistive Technology (AT) software, like screen readers, screen enlargers or alternative input devices, as well as test automation programs that communicate with application programs may need to clearly identify UI elements hosted within the application programs. More particularly, in one potential scenario, suppose an application program tester has found a defect related to a UI element in an application program and wants to continue to exercise the application at the same UI element to determine whether the defect was an aberration or permanent. In order to do so, the tester may want to reboot his computer and get back to the same defective UI element for testing.

However, currently there is no reliable mechanism of identifying these UI elements across reboots, across instances of an application, across localized versions, and across builds. Currently, depending on the operating system platform, it is possible to use a combination of role, name, location, position among siblings (e.g., $4^{th}$ child among n children), and other things. However, none of these properties on their own are sufficient; and many of them are fragile (e.g., location, name).

Thus, there is a need for systems and methods to provide identifiers for a UI element that persist across instances of an application, across localized versions, across builds, across reboots and other similar events. More particularly, there is a further need for platform level Application Program Interfaces (APIs) that can be used by a client program to receive persistent identifiers related to a source program and use such an identifier to locate a particular UI element in a target program.

SUMMARY

Described herein are Application Programming Interfaces that enable client applications to request and receive identifiers for user interface elements in a graphical user interface of a computer program, wherein the identifiers are capable of persistently identifying the user interface elements across different instances of the computer program, across different builds of the program, across reboots of the computer running the computer program etc. A persistent identifier is one that is not fragile and maintains its identity across events such those mentioned above.

In one aspect, the persistent identifiers are generated by using a hierarchical tree structure representation of the graphical user interface comprising the user interface element of interest. The identifiers are made persistent by including in the identifier, identifying information not only of the user interface of interest but also as much of the identifying information as is appropriate of the parent elements above the user interface of interest in the hierarchy of the tree structure. Such information describes a hierarchical path of inheritance for the user interface of interest within the graphical user interface. The path may be referred to as an element path and the identifier comprising a description of the path may be referred to as an element path identifier.

Furthermore, a set of Application Programming Interfaces are described herein that enable a client program to locate a target user interface in a graphical user interface of a target computer program by using the element path identifier of the target element. For example, by using APIs for generating persistent identifiers a client program can mark a user interface of interest and later use the persistent identifier to locate the user interface of interest in another instance of the program, across another build of the program and across other events that would have rendered any of the fragile identifiers useless.

In another aspect, a tree structure representation of a graphical user interface may comprise at least one branch portion that is associated with a strong name and has a scope inside of which elements of the strongly named branch are guaranteed to be uniquely identifiable by using a named branch element identifier. Thus in one embodiment of generating an element path identifier, elements of a named branch portion may be uniquely identified by their named branch element identifier alone. In yet another embodiment, sections of an element path comprising strongly named branches may be identified by the strong name of the named branch and the named branch element identifier of the lowest element still within the scope of the named branch portion. This reduces the quantity of identifying information stored in a element path identifier data structure. However, the efficiency of searches for target user interface elements can be improved by adding information related to all the elements in named branch portion.

The persistent identifier can be further improved by adding additional information within an element path identifier for reducing any residual ambiguity. For instance, sibling order information can focus a search and reduce ambiguity.

Additional features and advantages of the systems and methods described herein will be made apparent from the following detailed description that proceeds with reference to the accompanying drawings.

DETAILED DESCRIPTION

An Exemplary Hierarchical Representation of a Graphical User Interface

Although individual elements of a graphical user interface (e.g., a radio button) may appear to the user as a single composite item, it may actually be represented in the computer as a number of separate items or sub-elements that have been combined together. Furthermore, each of these sub-elements themselves can be composed from other sub-elements. In this manner, UI elements can serve as building blocks for building other, more complex, UI elements. Such an approach is useful because the software managing the user interface (e.g., the user interface framework) can re-use the definitions of certain common elements when assembling them into composite elements.

Figure 1:
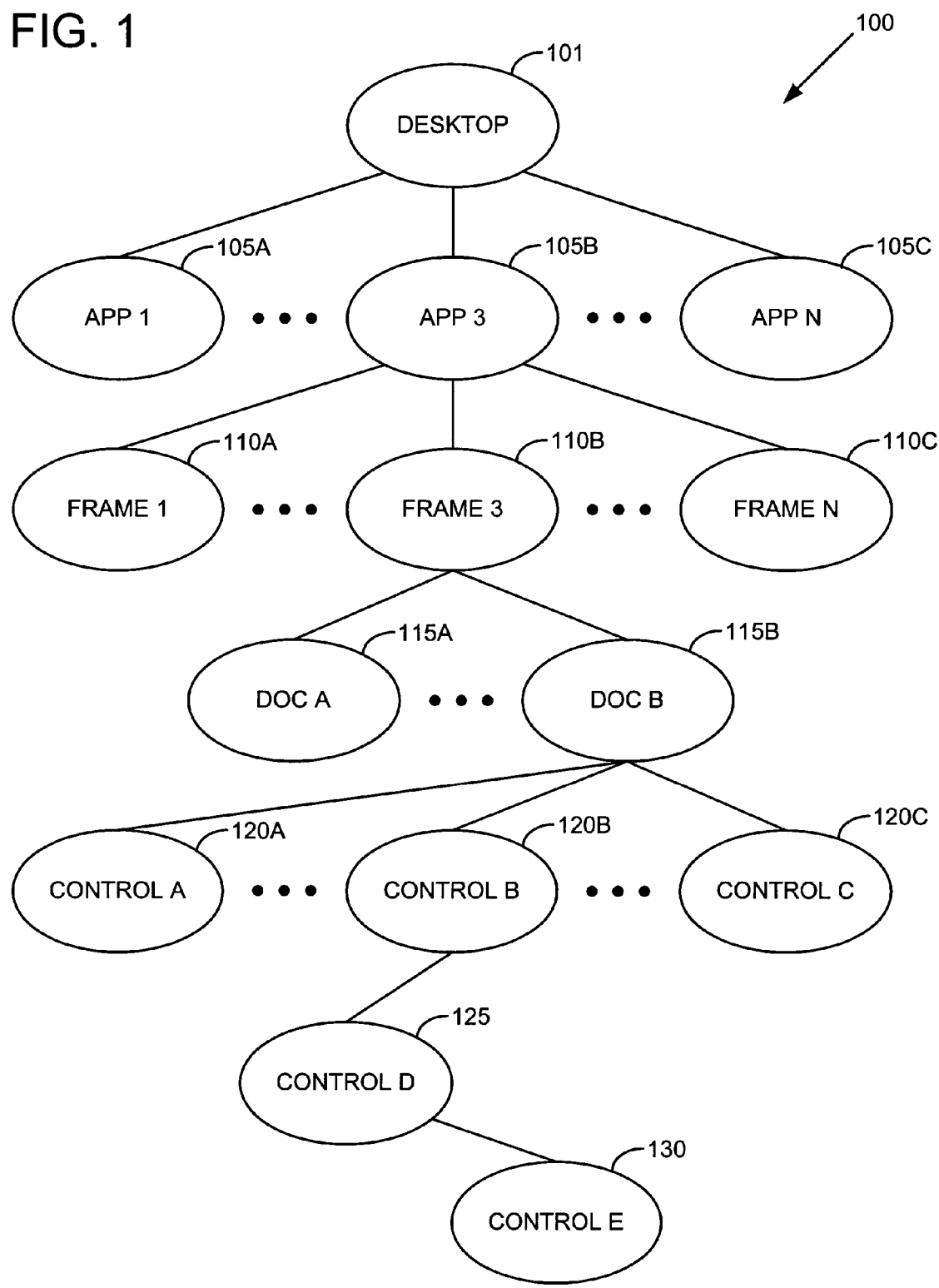
FIG. 1 is a block diagram illustrating a tree structure representation of a graphical user interface with multiple user interface elements arranged in a hierarchy.

FIG. 1 illustrates a tree structure representation 100 of a typical graphical user interface (hereafter, GUI) on a computer. More particularly, FIG. 1 illustrates how elements of a GUI can be shown as nested within each other in order to accurately describe their behavior (e.g., visual or functional). At very top of the tree structure 100 may be a desktop element 101 that is representative of the computer's desktop. The desktop element 101 may have represented within it several application elements (e.g., 105A, 105B and 105C) that have been invoked and ready to execute according to a user's instructions (e.g., a typical Microsoft® Windows desktop may have several instances of applications such as Microsoft® Word, Microsoft® Excel® etc. loaded and ready to be executed). At a lower level in the tree structure hierarchy may be several frames (e.g., 110A, 110B and 110C) that may be associated with an application 105B (e.g., a word processor application may have several frames visible to a user at any given time). Within each of the frames (e.g., 110B) may be several documents (e.g., 115A and 115B) and each document may contain within it several control UI elements 120A, 120B and 120C (buttons, listboxes, etc.). Control UI elements (e.g., 120A, 120B and 120C) may themselves be composites of other UI elements. For example, a dialog box, or a combo box, in turn may contain other control UI elements such as a button control at 125. Furthermore, the button element 125 itself may comprise other control UI elements such as 130 and such nesting can go on further deeper depending on the user interface and its component elements.

Exemplary Identifiers for Elements of a Graphical User Interface

Any one of the elements of the user interface illustrated in FIG. 1 may be associated with a number of different identifiers, which can be used to distinguish that particular UI element from other UI elements. Depending on the type of operating system platforms each instance of a UI element may be assigned at least one identifier. For example, in Microsoft® Windows based operating systems, applications may be associated with module identifiers that uniquely identify applications within a given desktop context. Also, many user interface platforms (e.g., Microsoft® Windows, Swing® for Java) allow for an alphanumeric identifier for UI elements commonly referred to as control IDs. Furthermore, in an objected-oriented environment, UI elements may also be associated with a class name associated with the control class to which they may belong. For instance, in a Microsoft® Windows based system, common UI elements such as combo box, list box, and button are associated with class names such as ComboBox class, ListBox class, and Button class respectively. Similarly, other user interface frameworks may have names for their respective classes of UI elements.

Although it is possible to identify UI elements using identifiers such as those listed above, none of them can singularly provide a strong identifier that is likely to persist across a reboot of the computer running the program, across a different build of the program when still in development, across the opening of an another instance of the same program, or opening of the same type of program on another computer. In such situations these identifiers alone prove to be fragile or too ambiguous. For instance, control identifiers (control IDs in Microsoft® Windows) by themselves are not very unique. On a given Microsoft® Windows desktop, for instance, two different UI elements (e.g., a button and a dialog box) running on two different applications may be assigned the very same control ID. Thus, in this example, searching by a control ID alone cannot unambiguously identify a selected one of those UI elements.

However, combining the control ID with another identifier may be helpful. Take for instance the same example as above, even if the control ID for the button element and the dialog element were same, if a composite identifier combined the control ID and the control class name associated with the individual UI element then the button UI element and the dialog box UI element may distinguishable from each other. Similarly, generating composite identifiers having additional information capable of identifying a UI element can increase the strength of the identifier's uniqueness and reduce the possibility of ambiguity.

Figure 2:
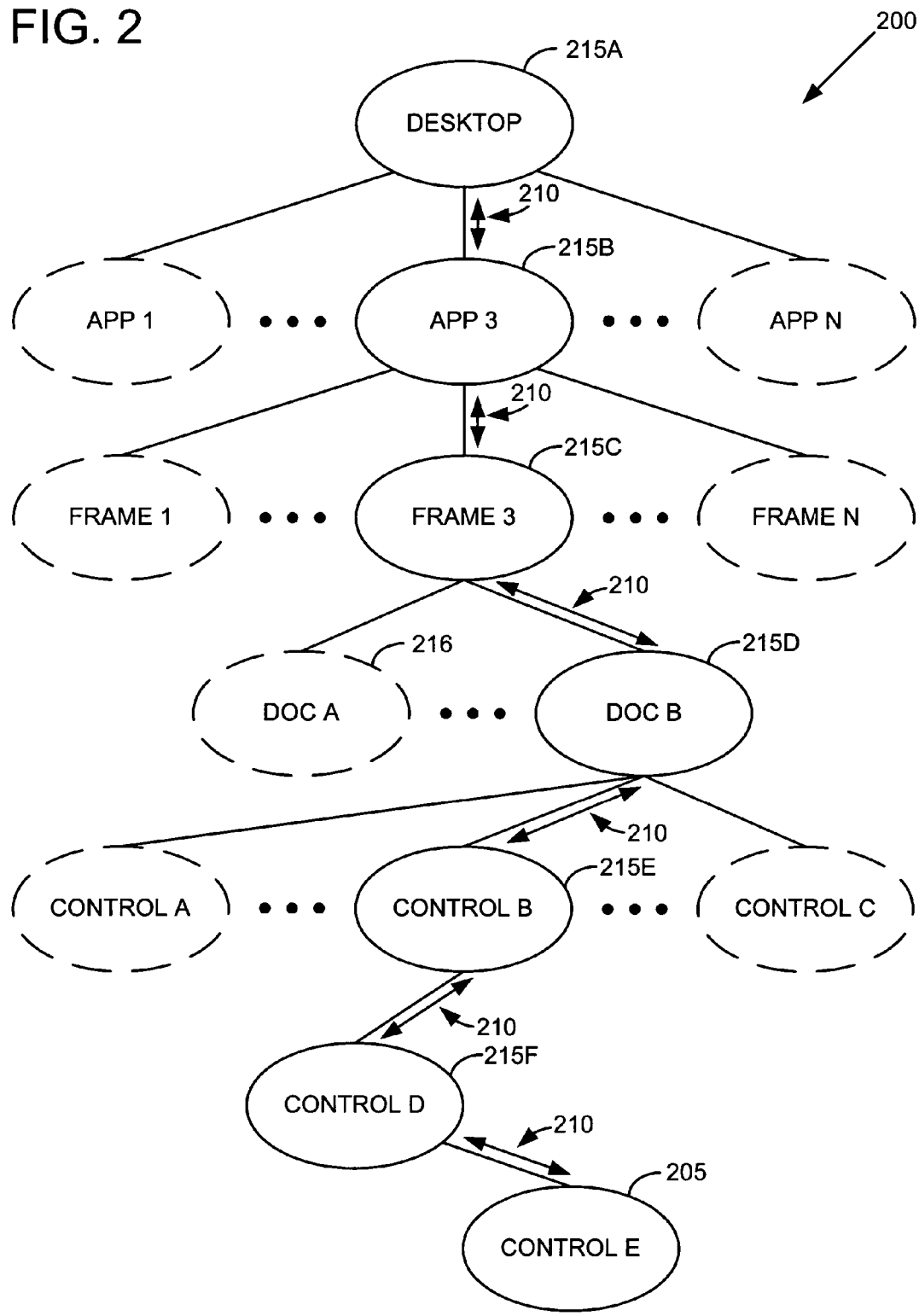
FIG. 2 is a block diagram illustrating the tree structure representation of FIG. 1 with an element path that may be used to persistently identify one of the multiple user interface elements.

An Exemplary UI Element Path Description as a Persistent Identifier of UI Elements Adding as much identification information that is directly associated with a UI element into a composite identifier of a UI element may be helpful in identifying it unambiguously. However, given the countless number of UI elements and the complexities involved, it is may not succeed all the time. Thus, yet another improvement may be to also add identification information related to parent elements to the composite identifier of a UI element. For instance, a UI element path description identifier can be provided which comprises not only identification information related to a target UI element for which a unique persistent identifier is to be generated but it may also include information related to its parent elements and possibly even its children and sibling elements. FIG. 2 is an illustration of the overall concept of an element path identifier for a target UI element 205 that may be part of a user interface represented as a tree structure 200. As shown in FIG. 2, an element path identifier may be generated for a target UI element 205 that comprises a collection of identifying information related to parent UI elements (e.g., 215A-215F) on an element path (e.g., 210) that describes the hierarchical arrangement between a target leaf UI element (e.g., 205) and a root element at desktop 215A. Elements (e.g., 216) not forming the path 210 are shown in FIG. 2 with broken border lines for the purpose of distinguishing them from elements that are within the path (e.g., 215D).

An element path description identifier may be able to serve as a strong identifier for a UI element because, even if the target UI element has other identifiers (e.g., module name, control ID, control class name etc.) that are identical to another UI element, it is less likely that they both would have the same parent elements, also with identical identifying information. Through concept of a path related identifier a UI element's unique hierarchy and parentage can be leveraged to identify it uniquely and persistently.

Exemplary Methods of Recording or Generating Identifiers of UI Elements

Figure 3:
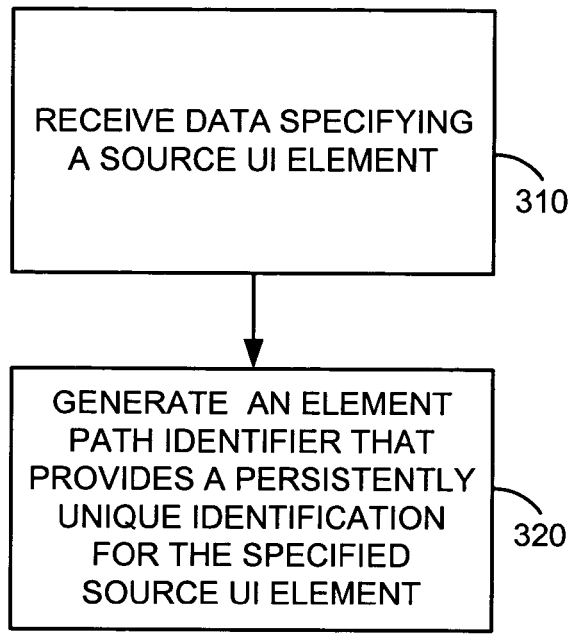
FIG. 3 is a flow chart describing an overall method of generating or recording an element path identifier of a selected source user interface element.

Persistent identifying information related to a selected source UI element may be recorded and later used as a parameter for a method of searching and locating a target UI element that matches the identifier of the source UI element. For example, the source element and target element may be different instances of the same element. For instance, a button of interest in a word processor program may be given a persistent identifier and the identifier may be used to locate the same button on the same program being run on a different computer. As shown in FIG. 3, at 310, a specification of a source UI element for which an identifier is to be generated may be received. Upon receiving such a specification, at 320, an element path identifier may be generated for the specified source UI element that provides a persistently unique identification of the source UI element.

Figure 5:
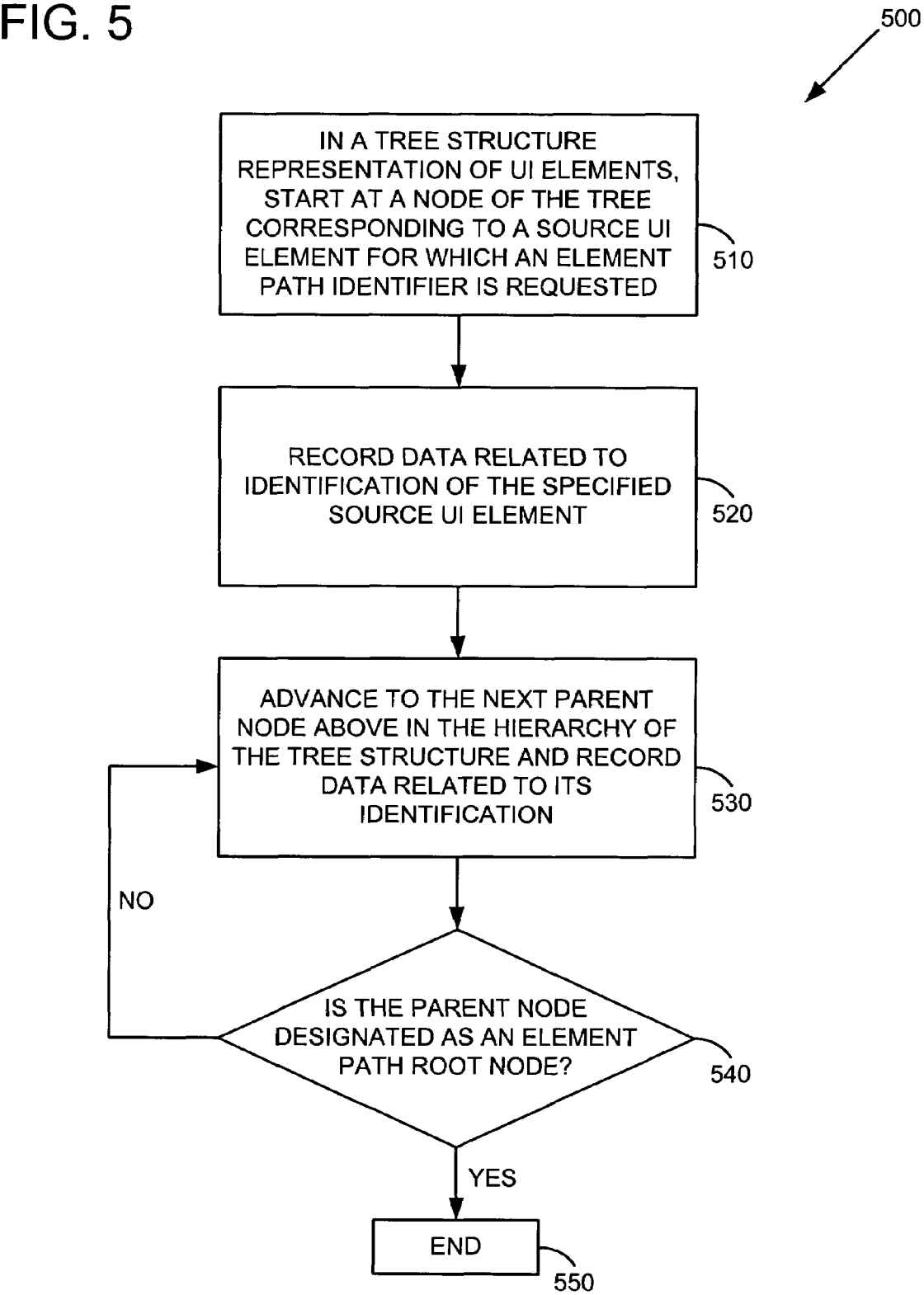
FIG. 5 is a flow chart describing in detail one method for generating an element path identifier for a source user interface element in a tree structure representation by starting at the source element leaf node and recording exposed identifier information of selected parent element nodes above in the hierarchy.

According to one embodiment, the method of recording or generating an element path description identifier for a source UI element may be implemented in a software component as described in FIG. 5. At 510, the method of recordation 510 can start at a leaf node representative of the source UI element (e.g., 205) within a hierarchical tree structure representation (e.g., 200) of the user interface of a source program within which the source UI element itself is a hosted component. At 520, any available identifying information related to the source UI element 205 may be recorded as a field in a data structure related to the element path identifier. Then at 530, the identifying information related to the next parent node (e.g., 215F) of the source UI element (e.g., 205) is recorded. At 540, this process is continued until a parent node designated as an element path's root node (e.g., the desktop node 215A or the application node 215B) is encountered, upon recording which the process of recordation may be ended at 550.

The information recorded at each UI element in an element path (e.g., 210) may be a function of what is exposed in that particular UI element's object model and may also depend on the user interface platform used to create the UI element. For example, it is possible for a user interface to comprise UI elements from a number of different UI platforms (e.g., Win 32 by Microsoft® Corporation, and Swing for Java etc.). Thus, the method of recordation should be capable of identifying a UI element as belonging to a certain user interface platform and record its identifying information accordingly. The actual information about each UI element recorded may include such items as control ID, module identifier, control class name etc. Initially, as the method is progressing up a tree representation, some identifying information (e.g., module identifier for identifying a UI element 205 as belonging within a certain application module 215B) may not be exposed until a higher element is reached. In that event, such information is recorded upon being exposed.

In the previous example, the topmost node in the user interface hierarchy 215A was also designated as the element path root node where the recording of the identifier information for the element path identifier was to be stopped. However, it is possible to designate a lower element (e.g., the application node 215B or the frame node 215C) to be designated as the element path root. This may be useful where a particular client system can ensure strong and persistent identification of elements up to a certain level in the user interface hierarchy or can devise other local methods of searching and identification of UI elements at certain levels. The element path root node may be provided as a parameter to the process 510.

Exemplary Methods of Searching UI Elements According to their Identifiers

Figure 4:
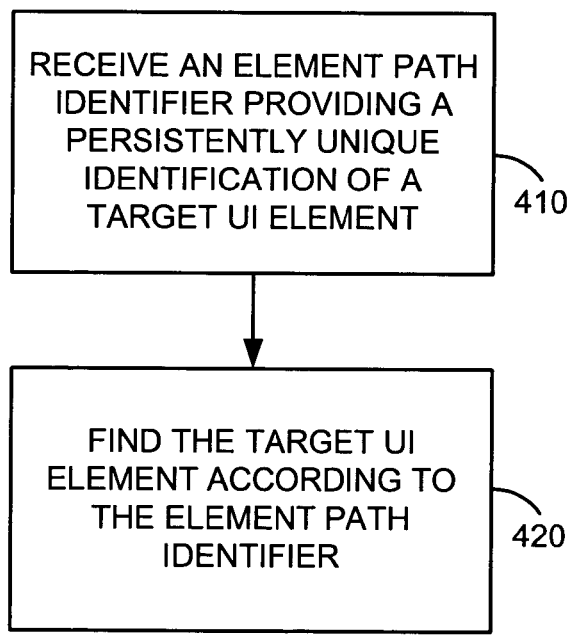
FIG. 4 is a flow chart describing an overall method of searching and locating a target user interface element according to its element path identifier.

Once an element path identifier is recorded, for instance, it may be used as a parameter in a search method applied to a target application to locate a UI element matching the identifier within the application. Such a process may be implemented in a software component for searching UI elements as described in FIG. 4. At 410, a specification of an element path identifier associated with a target UI element may be received. Upon receiving a specification of the element path identifier, at 420, the target UI element described by the identifier may be located.

Figure 6:
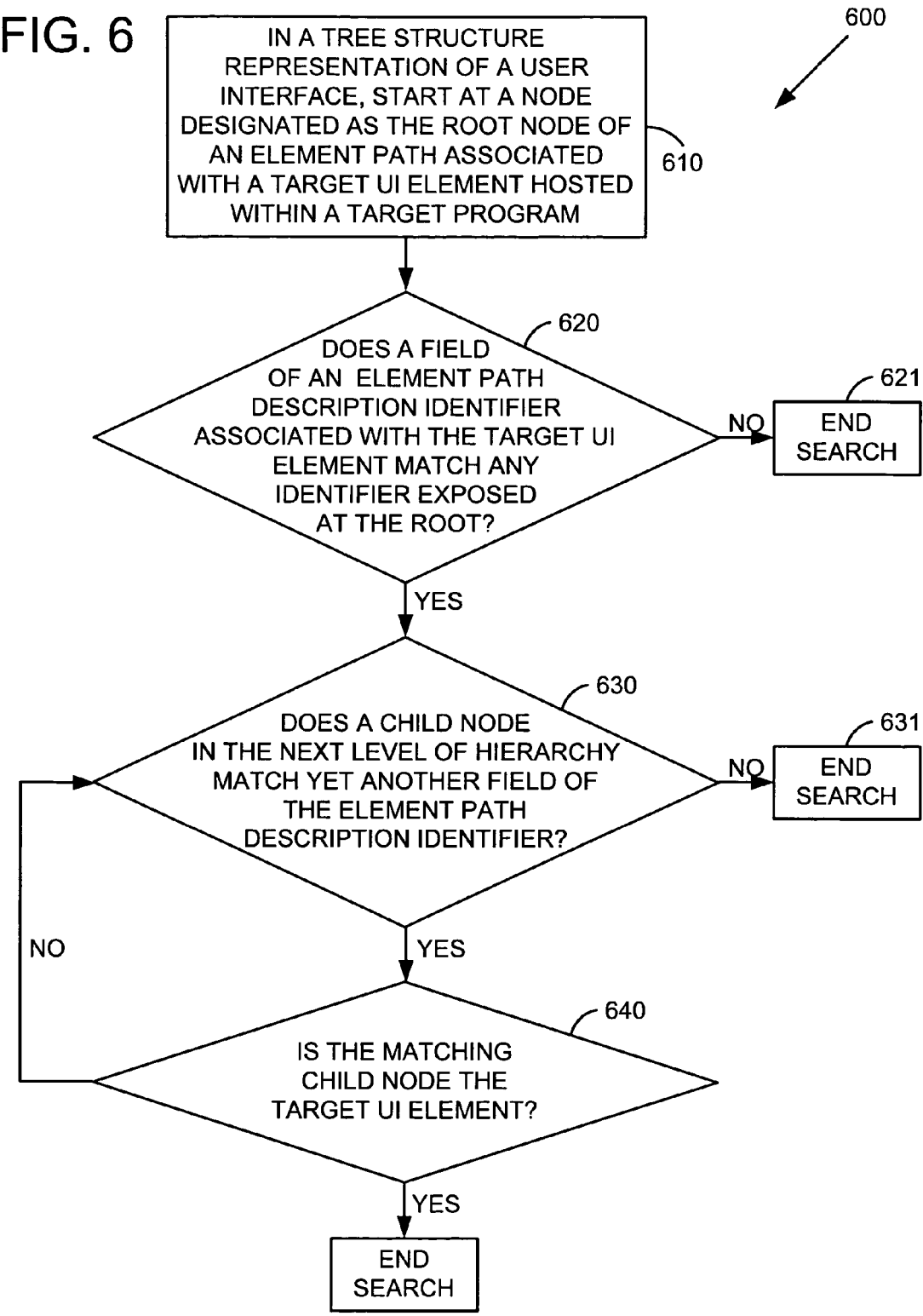
FIG. 6 is a flow chart describing in detail one method of locating a target user interface element in a tree structure representation of a user interface based on its element path identifier starting at a designated element path root node and successively pruning the tree by searching for the target element in selected branches according to the element path identifier.

According to one embodiment, the method 420 of locating the target UI element upon receiving a specification of an element path identifier may be implemented in a software component as described in FIG. 6. At 610, the search process may begin at a designated element path root node (e.g., 215A or a 215B) in a tree structure representation (e.g., 200) of a user interface of a target application (i.e., a computer program that may be hosting the target UI element). The designated root node of the element path can be any node within the tree structure; it does not have to be the topmost node such as the desktop node 215A. Generally, a search process is unlikely to begin at a desktop node 215A, unless, for example, the search scenario involves a system having multiple desktops (e.g., involving multiple operating system platforms). Then at 620, fields of the element path identifier data structure are evaluated to determine if any of the identifier data described therein matches the identifier data exposed at the root node (e.g., 215A or 215B). If no such match is determined, then at 621, the search process is ended. However if a match is in fact determined, then at 630, the search is advanced to other levels below in the hierarchy of the tree structure to determine which of the sibling elements at the next level exposes identifiers that match a corresponding field of the element path identifier. If no such match is determined, then at 631, the search may be suspended. Thus, the search may be progressed below to even lower levels in the hierarchy until at 640 one of the child nodes exposes identifiers that match a corresponding identifier associated with a target UI element in its element path identifier. If a child node corresponding to the target UI element is not determined at 640 then the search is returned to step 630 to continue the search until such a child node is found. Once a child node corresponding to the target UI element is found then the search is ended at 651.

The search process 600 described above prunes the tree structure 200 by progressing along the element path 210 one level at a time wherein one of the sibling elements forming a separate branch is distinguishable over the others of its siblings. Such a process eliminates the need to search every branch in a tree structure. However, it is also possible to search all branches from a certain branch root of the tree structure if identifying information that distinguishes a branch root node from its siblings is not available in the element path information. For example, the branch root node 215D may not be distinguishable from the branch root node 216 based on the element path information. However, such a search process may be more complex and would certainly be more time and resource consuming than the process described with reference to FIG. 6.

An Exemplary System for Generating and Using Element Path Identifiers

Figure 7:
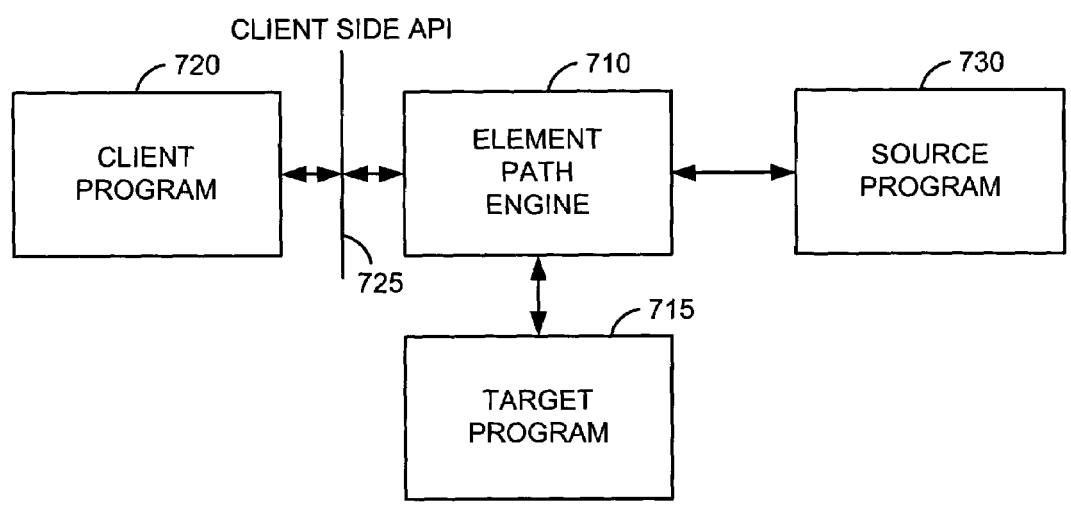
FIG. 7 is a block diagram of a system for generating element path identifiers of selected user interface elements and locating user interface elements based on their element path identifiers.

The methods of generating element path identifiers for selected source UI elements and the complementary process of identifying or locating a target UI element according to such an identifier may be implemented within a system as shown in FIG. 7. The system may comprise an element path engine 710 programmed for generating element path identifiers of source UI elements hosted within a source program 730 upon receiving a request to do so via a client program 720. Furthermore, the element path engine 710 may also locate or identify a target UI element within a target program 715 based on an element path identifier provided via a client program 720. The communication between client program 720 and the element path engine 710 may be enabled via an Application Programming Interface (API) 725 which can allow the client program to pass function calls including element path description identifiers as its parameters to functions implemented for searching of target UI elements. Also, the API 725 may be further capable of passing function calls including specification of one or more source UI elements as parameters to functions implemented for generating element path identifiers of specified UI elements. Embodiments of such APIs will be described in further detail below.

The client program 720 may be a test program which is exercising an instance of a program (e.g., 730) such that the test program may identify a source UI element of interest for which it may request a persistent identifier such as its element path identifier through the element path engine 710. Later on, the test program (e.g., the client 720) may want to use the persistent identifier to locate another instance of the same UI element in another program (e.g., the target program 715). The source program 730 and the target program 715 may be located on the same or different computers.

In yet another scenario, the client program 720 may use the element path engine 710 to record a user's access of various UI elements within a source program 730 by identifying the accessed UI elements using the persistent identifiers and later play back the user's access scenario on another program (e.g., 715). For example, such an implementation may be helpful in creating a help menu where users are walked through the procedures of using a program by the way of an example. The above examples are meant to be illustrative and other uses for a persistent identification of UI elements are possible.

An Exemplary Element Path Description Data Structure

Figure 8:
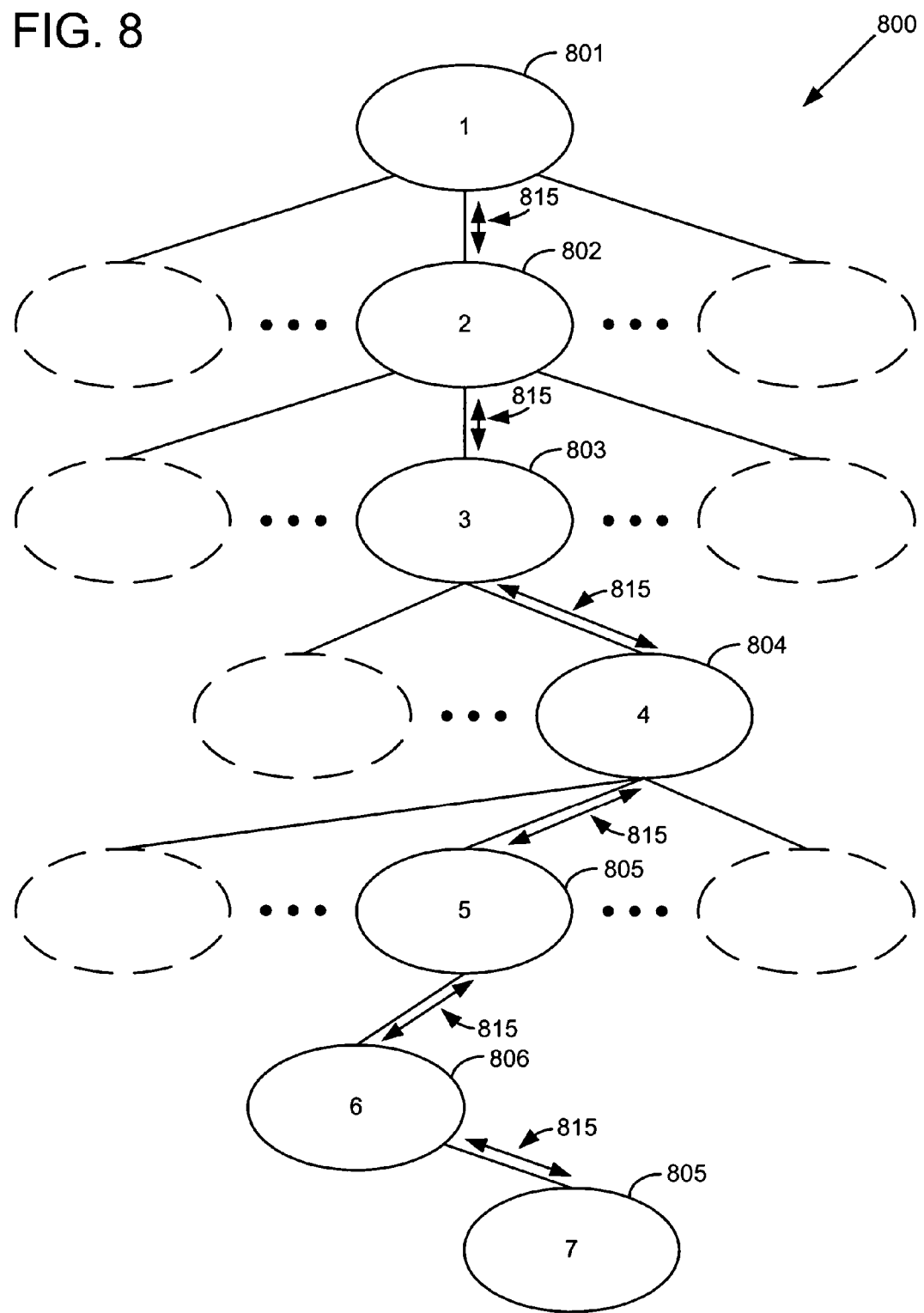
FIG. 8 is a block diagram illustrating another element path of a source user interface element used for generating its persistent identifier.

FIG. 8 illustrates an exemplary tree structure representation 800 that is representative of a user interface. The UI element of interest labeled '7' 805 may be persistently identifiable via an element path description that comprises identifier information related to the UI element of interest 805 as well as its direct and indirect parent elements. Thus, the combination of parent elements '1', '2', '3', '4', '5', and '6' (801-806) may form an element path 815 which can be used to provide a persistent identifier for the UI element of interest 805.

Figure 9A:
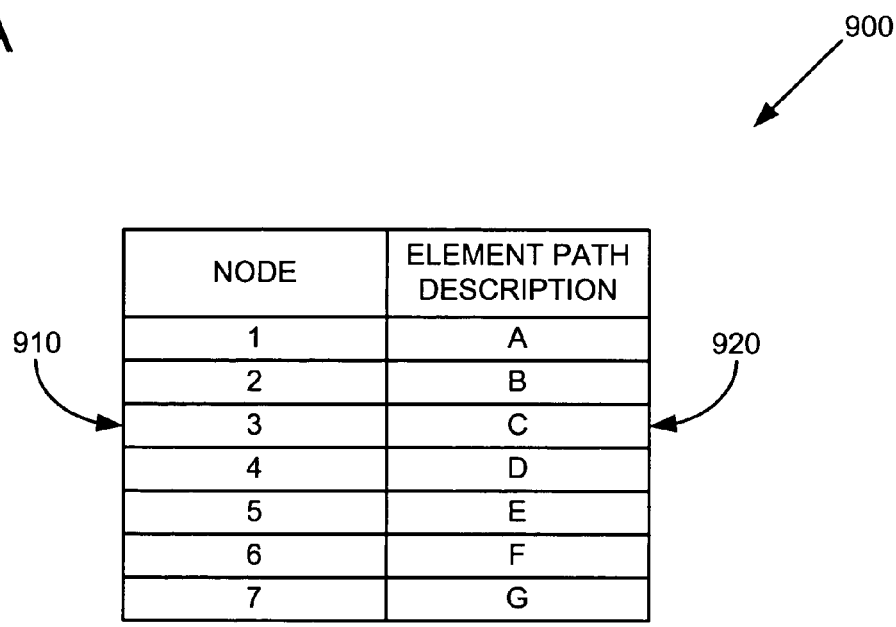
FIG. 9A is a block diagram of an element path identifier data structure for the exemplary element path of FIG. 8.
Figure 9B:
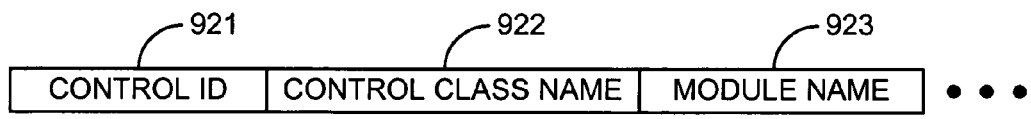
FIG. 9B is a block diagram of exemplary fields or members of the element path identifier data structure of FIG. 9A.

FIG. 9A illustrates an exemplary data structure for storing element path identifier information corresponding to the element path 815 of FIG. 8. An element path description identifier 900 may comprise nodes '1-7' 910 correspondingly associated with identifiers 'A-G' 920. As shown if FIG. 9B, each of the identifiers 'A-G' 920 may comprise fields such as control ID 921, control class name 922, module name 923 etc., as described above. Other identifiers as appropriate may be provided that can further help distinguish each UI element over other UI elements. As noted above, one factor determinative of what information may be exposed at each node of a tree structure representation of a user interface may be the user interface platform used to create the individual UI element.

An Identifier for a UI Element Guaranteed to be Unique within a Scope

Figure 10:
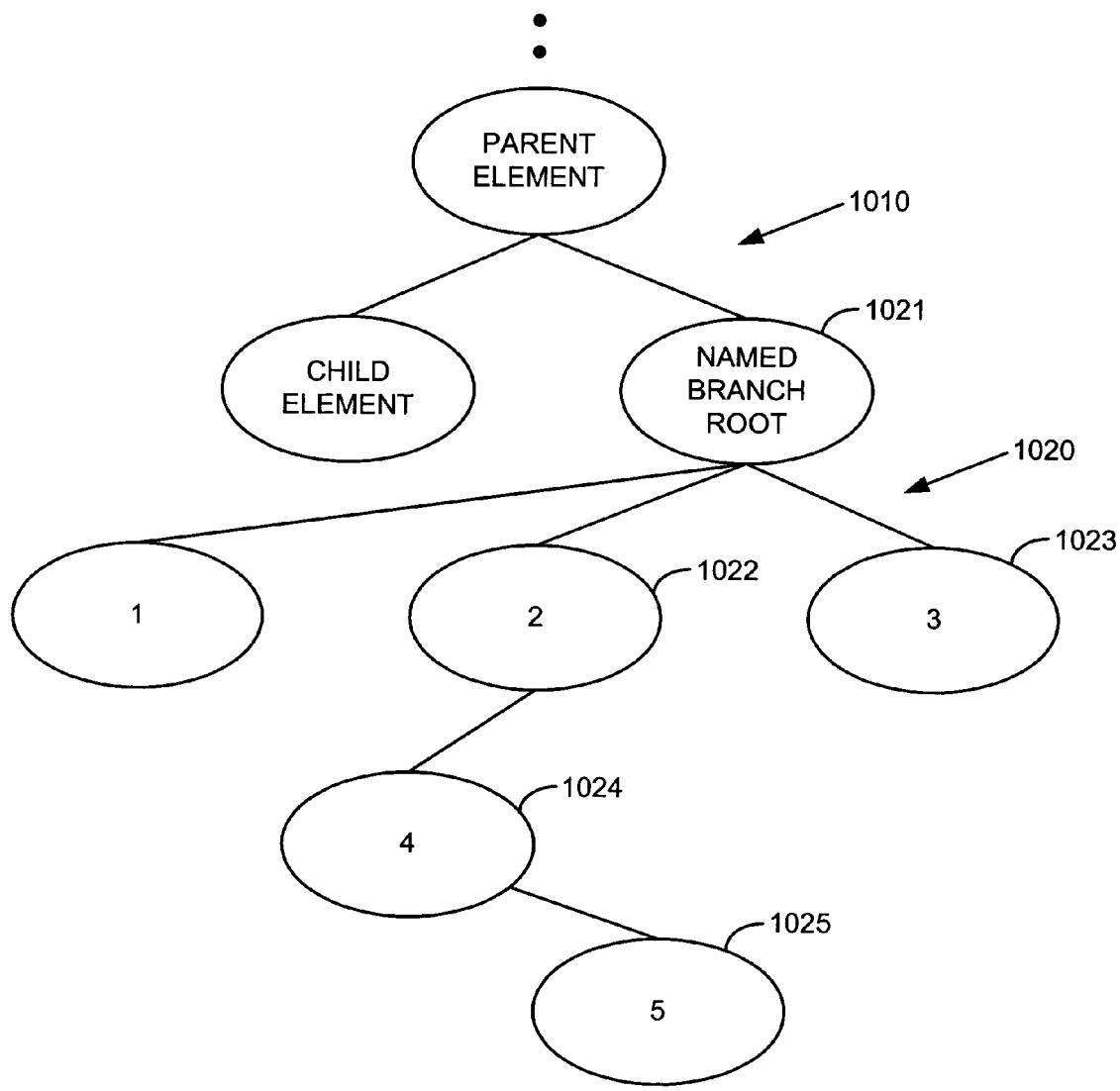
FIG. 10 is a block diagram of a branch portion of a user interface tree structure representation (e.g., FIG. 8), wherein one of its sub-branches has a strongly named root.

As noted above, identifiers of UI elements within an element path can comprise a wide range in the strength of their identity with a particular UI element. Thus, a process of recording or generating an element path or even the process of searching for a UI element according to its element path can be adjusted depending on the strength of the identifier. For instance, suppose the branch representation 1010 of FIG. 10 represents a branch portion of the tree structure representation of 800 of FIG. 8. Within the branch portion 1010 may be a another branch portion 1020 with a named branch root 1021 such that within a given scope of the branch (e.g., between the named branch root 1021 and the child leaf node 1025) all the children nodes (e.g., 1022, 1023, 1024 and 1025) are uniquely identifiable from each other by an identifier. In this example, that would mean that within the given branch scope (e.g., between 1021 and 1025) each of the children nodes (e.g., 1022, 1023, 1024 and 1025) may not have any ambiguity between each other. Also, even if the tree structure is changed by moving one of the children elements (e.g., 1022, 1023, 1024 and 1025) to another location within the scope the moved child element would retain its unique identifier. For example, such an identifier is possible when a branch portion 1020 is related to a composite UI element that is created and stored under a specially strong name and all the component elements can be uniquely identified within the scope of the branch portion 1020. This may be possible in those instances when a user interface represented by the tree 800 comprises components that are themselves composite UI elements (e.g., 1020) that were created and stored under a strong name and later associated with the larger user interface 800.

Figure 11:
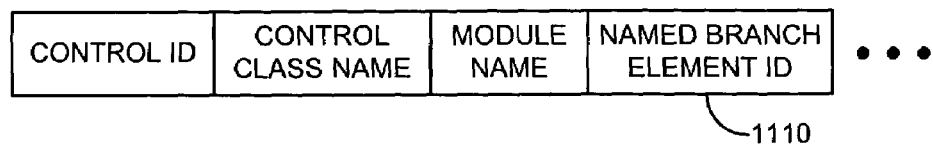
FIG. 11 is a block diagram of fields or members of an element path data structure (e.g., FIG. 9A) with at least one field designated for a named branch element identifier.

An Exemplary Element Path Identifier of a UI Element in a User Interface Tree Representation Comprising Strongly Named Branches The strong name associated with a named branch 1020 may be a file name or any other type of strong identifier of the named branch root 1021. For example, such a name may be referred to as a named branch root identifier and each UI element within a scope related to the named branch root may be uniquely identifiable by a named branch element identifier (hereafter, named branch element ID). An element path identifier data structure for a user interface comprising such a named branch may need additional fields for identifying UI elements (e.g., 1022) that belong within the scope of named branch 1020. For instance, FIG. 11 illustrates a data structure 1100 for an element path description identifier including a named branch element ID field 1110. The named branch element ID field 1110 is capable of uniquely identifying a related UI element within a scope associated with a respective named branch.

Figure 12:
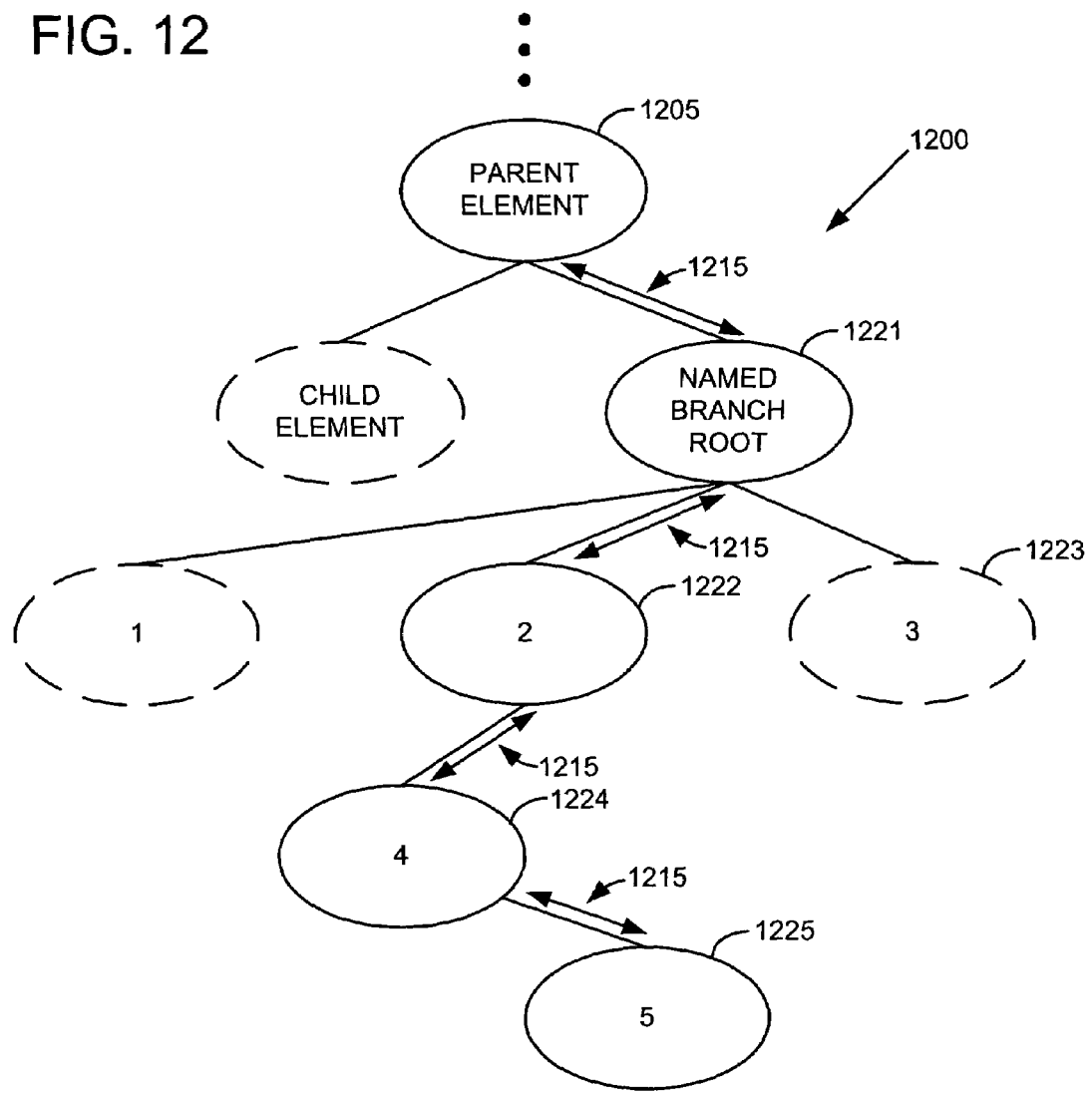
FIG. 12 is a block diagram illustrating an element path of a user interface element of interest within a named branch portion of a user interface tree structure.

Methods of Recording Element Path Identifiers of UI Elements and Searching for UI Elements by Such Identifiers in a User Interface Tree Structure with Strongly Named Branches The user interface tree structure representation 1010 comprising a named branch portion 1020 may have an element path corresponding to a UI element 1025 as shown in FIG. 12. The element path 1215 for the UI element 1225 is shown comprising identifier information including information related to its parent UI elements 1205, 1221, 1222, and 1224. The information of UI elements not in this path (e.g., 1223) are not included. Using the process 500 described above an element path description identifier may be recorded including all parent elements between a designated element path root node and a source UI element. However, as noted above with reference to FIG. 10 certain UI elements (1022-1025) may be guaranteed to be uniquely identifiable within a given scope and in that event, there may not be a need to record (in an element path identifier) identity information regarding all of the parent elements of UI element within such a scope.

Figure 13:
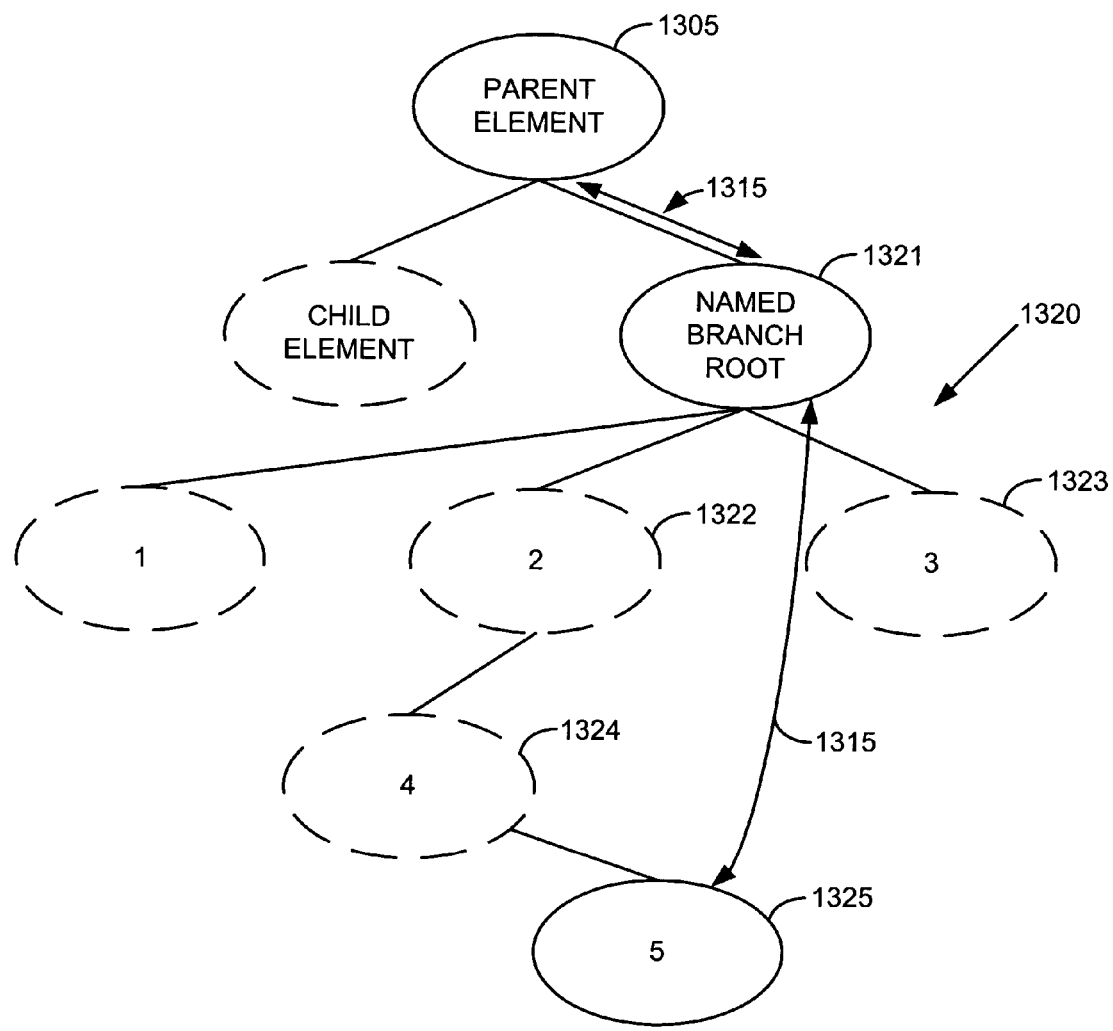
FIG. 13 is a block diagram illustrating an element path of a user interface element of interest within a named branch portion of a user interface tree structure, wherein the path does not include all of the parent elements of the user interface element of interest.

Thus, as shown in FIG. 13, the parent elements 1322 and 1324 of the UI element of interest 1325 are not part of the element path 1315 and no information regarding their identity or their special relationship with the UI element of interest 1325 is recorded as part of its element path identifier. This is possible because within the scope of the named branch portion 1320 the UI element is guaranteed to be uniquely identifiable by its named branch element ID (e.g., 1110). By simply recording a named branch element ID 1110 a named branch element may be located within its uniqueness scope by systematically searching all sub-branches of the named branch portion 1320. However, at 1305 identification information for a parent node that is outside the scope of the named branch 1320 may still need to be recorded. Alternatively, the parent node 1305 or even one of its parent nodes above in the hierarchy may be itself a part of another named branch within which scope it is uniquely identifiable. In that event, only their corresponding named branch element ID may be recorded as part of an element path identifier.

Strictly recording only the minimum amount of identification information that is necessary for locating a UI element may not always be helpful for increasing the speed of a search. The named branch 1320 comprises relatively few sub-branches (two) and a small number of sub-elements. This may not always be true. Searching for a sub-element by its element path identifiers which do not contain the identification information for all its parent elements may mean all branches have to be exhaustively searched which can be time and resource consuming. Thus, including (in an element path identifier) the identification information of parent elements of a named branch UI element (as shown in FIG. 12) can improve the speed of searching for that UI element.

Figure 14:
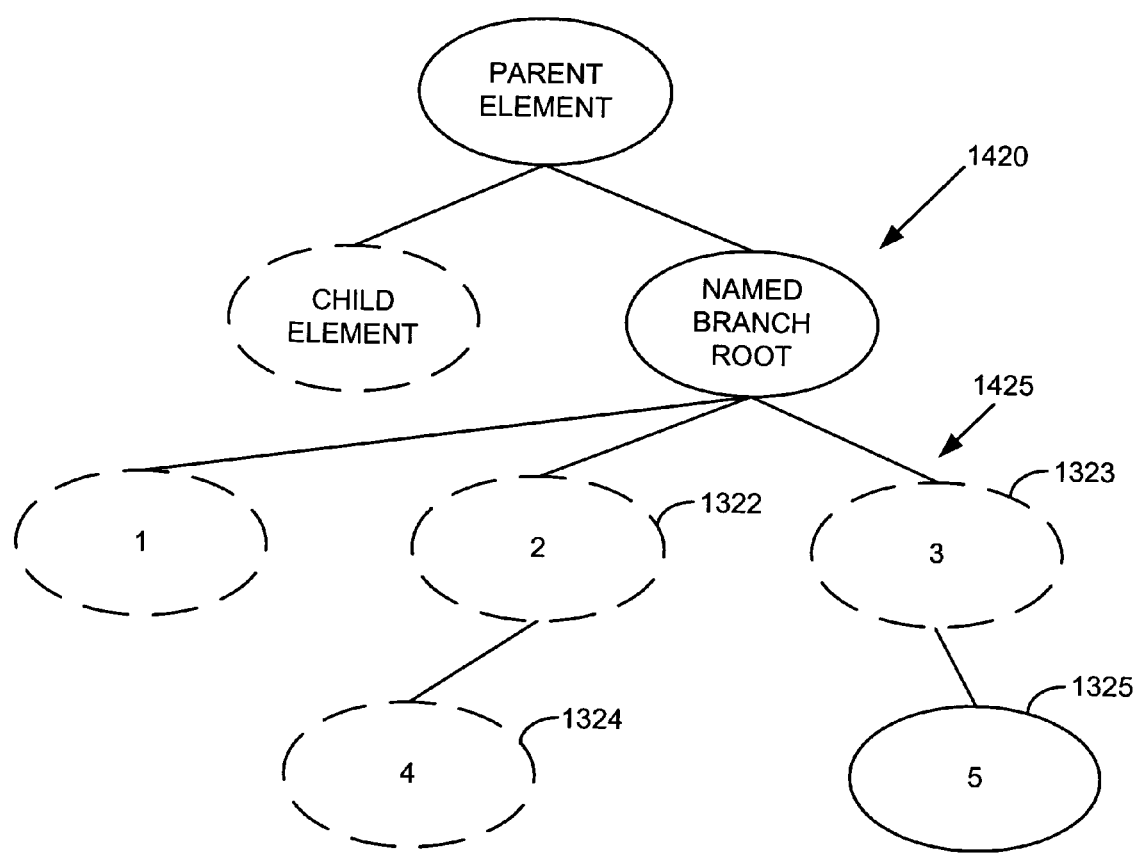
FIG. 14 is a block diagram illustrating a user interface element of interest which has been moved from its original location recorded in its element path identifier.

This can also be helpful in other circumstances. For instance, FIG. 14 illustrates a scenario wherein the named branch portion 1420 is shown with the UI element of interest 1325 which was originally shown in FIG. 13 as a child of the element 1324. However, perhaps in a later build of this user interface, the UI element of interest 1325 has been moved to be the child of 1323 UI element. If the element path identifier for the UI element of interest 1325 recorded a named branch element ID for the UI element of interest 1325 then it can be located in a playback scenario even if it has been moved to another sub-branch 1425 of the named tree branch 1420. This may be possible regardless of whether the identifier information of its original parents 1324 and 1322 were recorded or not.

Figure 15:
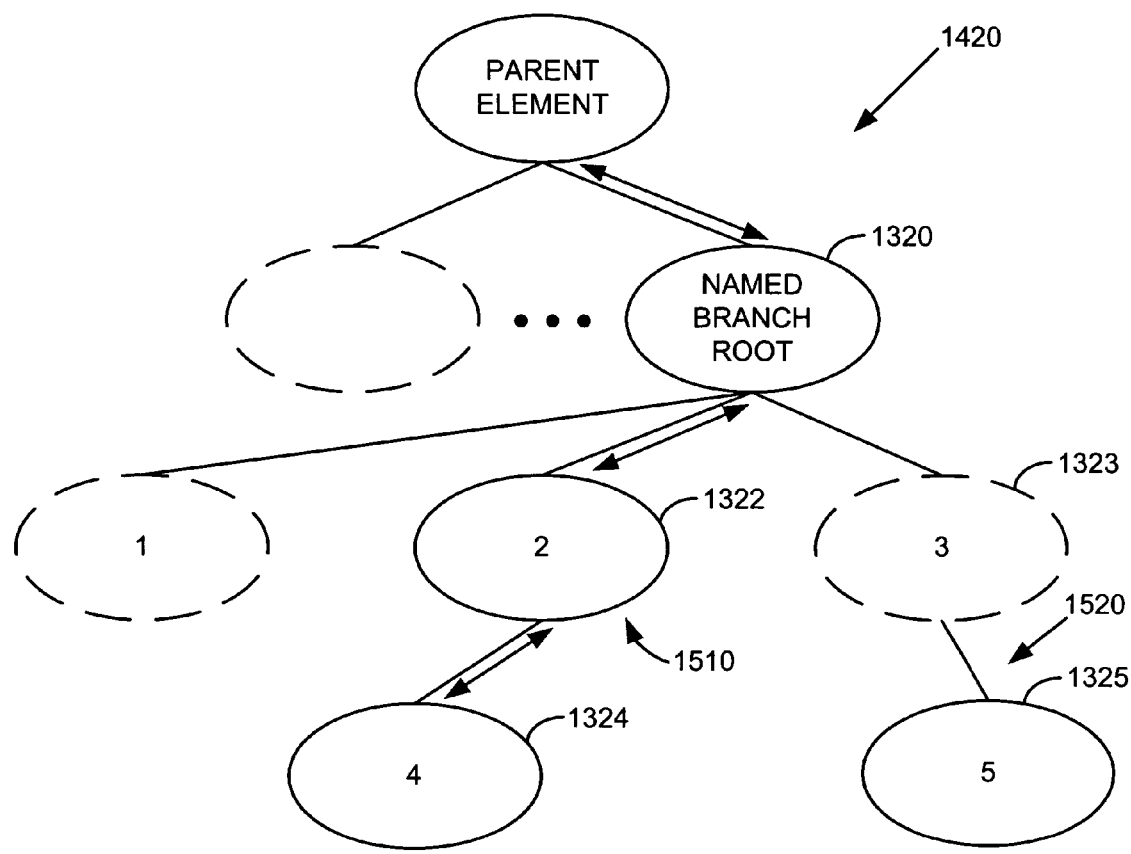
FIG. 15 is a block diagram illustrating an element path for persistently identifying a user interface of interest that may be moved from its original location, wherein the path includes the identifying information related to its immediate parents in its original location.

However again in this scenario, as before, recording the identifier information regarding parent elements 1322 and 1324 of a UI element of interest 1325 may help improve the efficiency and speed with which it is located later. For instance, as shown in FIG. 15, a search method may first direct the search for the UI element of interest 1325 in a branch 1510 where according to a previously recorded element path description identifier the UI element of interest 1325 was to be located. However, only in the event the UI element is not located in the expected location then the search may be directed back to the nearest named branch root 1320 and the rest of the sub-branches (e.g., 1520) of the named branch 1420 may need to be exhaustively searched to locate the UI element of interest 1325. In this scenario, including the identification information for the parent elements 1322 and 1324 may be optional. However, such information may help make the search process more efficient.

Figure 16:
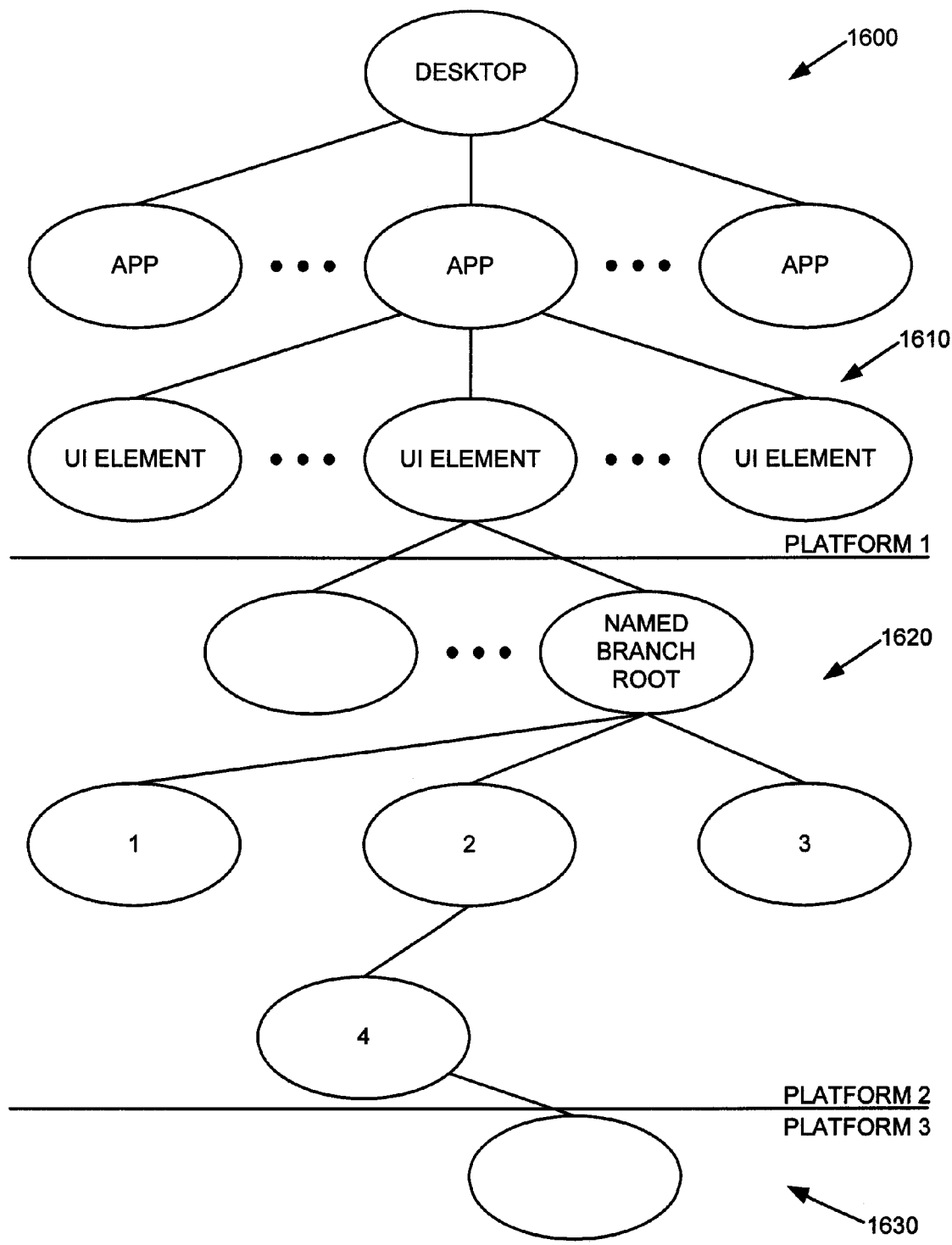
FIG. 16 is a block diagram of a tree structure representation of a user interface wherein the various elements of the user interface may be created within different user interface platform types.

Methods of Recording Element Path Identifiers and Searching by Such Identifiers in a User Interface Tree Structure with Strongly Named Branches Nested within Other Branch Types FIG. 16 illustrates a tree structure representation 1600 of a user interface wherein several elements of the interface are created using several different user interface platforms with differences in identifier information. For instance, branch portion 1610 may be created within a first user interface platform type Platform 1. Branch portion 1620 may be created using a second user interface platform type Platform 2, which is capable of providing strongly named branches with a certain scope within which each element is uniquely identifiable. Then at yet another level, elements of the user interface representation may be created using yet another user interface platform type Platform 3. Also, UI elements created using different user interface platforms may be nested within each other.

Furthermore, the process of recording an element path description and the process of searching for target UI elements can adaptively record information based on the platform affinity of the UI elements on a given path.

Embodiments of APIs for Implementing Methods of Recording Element Path Identifiers of Source UI Elements and Searching for Target UI Element in a User Interface Representation Using Such an Identifier The method of recording an element path identifier for a source UI element (e.g., the methods of FIGS. 3 and 5) may be implemented using API software components (e.g., 725) including function calls that client programs 720 can call on the element path engine 710. The same may apply to methods of searching for a target UI element (e.g., FIGS. 4 and 6) based on its element path identifier (e.g., FIGS. 9B and 11).

The API for generating or recording an element path identifier for a source UI element may be as follows in code representation:

Public: static ElementPath*GetElementPath (LogicalElement*logical element);

The above GetElementPath method receives an input parameter "LogicalElement" and returns as its result an ElementPath. The LogicalElement parameter can be any local identifier (e.g., Control ID) of a source UI element for which an element path description is to be generated. Such an identifier need not be a persistent identifier but it should at least provide a pointer to a starting point at which recording of an element path description may begin. The result returned is the ElementPath which can be a data structure implemented as shown and described with reference to FIGS. 9B and 11.

The API for generating an element path description identifier for a source UI element may also be implemented as follows in code representation:

Public: static String*GetElementPathString (LogicalElement*logical element);

In this implementation the result returned is not an ElementPath data type instead it is a string type description of an element path. This may be useful for cutting and pasting an element path description into pieces of code. For instance, a test case code can use string descriptions of a UI element's element path identifier to allow a test program locate and exercise the UI element.

Complementing the above two APIs may be APIs for searching or locating target UI elements based on their respective element path descriptions. Such APIs may be as follows:

Public: static LogicalElement*FindLogicalElement(ElementPath* elementpath);

In the above API implementation, an ElementPath type parameter related to a target UI element is received from a client program (e.g., 720 of FIG. 7), a search is performed accordingly and a result of LogicalElement type or any local indicator of the target UI element in target program is returned.

A find method can also be implemented that receives a string type description of an element path as an input parameter. Such an implementation may be as follows:

Public: static LogicalElement*FindLogicalElementString (String* elementpathstring);

In this API the input parameter is a string type description of the element path and it complements the GetElementPathString(LogicalElement*logical element) API.

These APIs may be further refined by adding other parameters. For instance, GetElementPath API can have a flag parameter that could be set such that sibling order of each UI element in an element path hierarchy is recorded as part of the ElementPath result when the flag is set to be true. Then later in the FindLogicalElement the sibling order of UI elements in an element path may be useful for resolving ambiguity. The same may apply to the GetElementPathString and FindLogicalElementString APIs Other specific implementations of the APIs are possible that implement the functionality described above without the exact same naming convention for the methods and class names.

Other improvements are possible. For instance, if the element path root node need not be the topmost node in a hierarchy (e.g., 215A) then identifier information of whatever is the element path root node may be provided as a parameter of the GetElementPath API so that only information regarding the UI element of interest and the element path root node are recorded. Also, FindLogicalElement can have as a parameter the element path root node so that the search from a UI element is begun at the designated element path root.

Other specific implementations of the APIs are possible that implement the functionality described above without the exact same naming convention for the methods and class names. In fact, the implementations need not even be in an object-oriented language. In fact, the implementations need not even be in an object-oriented language.

Alternatives

Having described and illustrated the principles of our invention with reference to the described embodiments, it will be recognized that the described embodiments can be modified in arrangement and detail without departing from such principles. Although, the technologies described herein have been illustrated via examples of elements of graphical user interfaces, any of the technologies can use other user interface elements (e.g., sound). The APIs described herein have been illustrated with selected input parameters for the purposes of describing functionality of generating identifiers and searching by identifiers. Other parameters may be added or some of the parameters may be removed and still implement the principles of the invention. The same applies to the output parameters. Also, the element path identifiers have been described using selected component identifiers of elements in an element path. Other identifiers as appropriate for a selected user interface environment may be used as well. Furthermore, the functionality described herein with respect to the generation of identifiers and their use in searching and locating interface elements may be implemented across multiple software component modules. For instance, another software component may be introduced between the API modules and the client program or the element path engine to pass function calls, receive results and conduct other comparable actions.

Also, it should be understood that the programs, processes, or methods described herein are not related or limited to any particular type of computer apparatus. Various types of general purpose or specialized computer apparatus may be used with or perform operations in accordance with the teachings described herein. Actions described herein can be achieved by computer-readable media comprising computer-executable instructions for performing such actions. Elements of the illustrated embodiment shown in software may be implemented in hardware and vice versa. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method of generating identifier data for persistently identifying a user interface element of interest in a graphical user interface of a source computer program, the method comprising:
   receiving data indicative of the user interface element of interest from a first software component; and
   in response to receiving the data indicative of the user interface element of interest, generating an element path identifier of the user interface element of interest for persistently and uniquely identifying the user interface element of interest across different states of the first software component and returning at least the unique element path identifier to the first software component, the generating comprising storing exposed identifiers associated with selected ancestor nodes of a leaf node within a tree structure representation of the graphical user interface, the selected ancestor nodes located along a path of the tree structure representation from the leaf node to a designated root node, the selected ancestor nodes excluding at least one ancestor node of the leaf node located along the path that is uniquely identifiable from at least one first ancestor node of the leaf node located along the path within a scope of a strongly named branch of the tree structure representation having a second ancestor node of the leaf node located along the path as the strongly named branch root node, the excluded at least one ancestor node being located between the strongly named branch root node and the at least one first ancestor node along the path, the exposed identifiers associated with the selected ancestor nodes being stored in the element path identifier, the leaf node representing the specified user interface element of interest;
   wherein persistently and uniquely identifying the user element of interest comprises persistently and uniquely identifying the user interface element of interest across reboots of a computer running the source computer program.

2. The method of claim 1, wherein generating the element path identifier is implemented by a second software component communicative with the source computer program.

3. The method of claim 1, further comprising converting the element path identifier to a string type data structure.

4. The method of claim 1, wherein the exposed identifiers are local alpha numeric identifiers not guaranteed to be unique, a class name, a module name associated with an application program or a sibling order.

5. The method of claim 1, further comprising:
   storing in the element path identifier a strong name associated with the strongly named branch along with the named branch element identifier.

6. At least one computer-readable medium having stored thereon computer-executable instructions related to a function responsive to a function call from a first software component, the function comprising:
   an input parameter representing a user interface element of interest in a graphical user interface of a source computer program;
   an output parameter representing an element path identifier for persistent unique identification of the user interface element of interest across multiple states of the source computer program, wherein the element path identifier comprises a hierarchical path of inheritance from the user interface element of interest to a parent root element; and
   executable software for receiving the input parameter representing a user interface element of interest and in response, generating the output parameter representing an element path identifier of the user interface element of interest such that the output parameter represents an identifier capable of persistently identifying the user interface element of interest across different builds of the source computer program, the generating comprising storing exposed identifiers associated with selected ancestor nodes of a leaf node within a tree structure representation of the graphical user interface, the selected ancestor nodes located along a path of the tree structure representation from the leaf node to a parent root node representing the parent root element, the selected ancestor nodes not including at least one ancestor node of the leaf node located along the path that is uniquely identifiable from at least one first ancestor node of the leaf node located along the path within a scope of a strongly named branch of the tree structure representation having a second ancestor node of the leaf node located along the path as the strongly named branch root node, the excluded at least one ancestor node being located between the strongly named branch root node and the at least one first ancestor node along the path, the exposed identifiers associated with the selected ancestor nodes being stored in the element path identifier represented by the output parameter, the leaf node representing the user interface element of interest.

7. The computer-readable medium of claim 6, wherein the element path identifier is a string type data structure.

8. The computer-readable medium of claim 6, wherein the element path identifier comprises class names of component elements of an element path in the tree structure representation and related to the element of interest.

9. The computer-readable medium of claim 6, wherein the element path identifier comprises a module name of an application program related to component elements of an element path in the tree structure representation and related to the element of interest.

10. The computer-readable medium of claim 6, wherein the element path identifier comprises sibling order data.

11. At least one computer-readable medium having stored thereon computer-executable instructions related to a function responsive to a function call from a first software component, the function comprising:
an input parameter representing an element path identifier of a target user interface element in a graphical user interface of a target computer program, wherein the element path identifier comprises a functional hierarchical path of inheritance from the target user interface to a parent root element;
an output parameter representing a location of the target user interface element within a hierarchical tree structure representation of the graphical user interface; and
executable software for receiving the element path identifier of the target user interface element and determining the output parameter representing the location of the target user interface element such that the output parameter represents an identifier capable of persistently and uniquely identifying the target user interface element across different builds of the target computer program, the determining comprising storing exposed identifiers associated with selected ancestor nodes of a leaf node within the hierarchical tree structure representation of the graphical user interface, the selected ancestor nodes located along a path of the hierarchical tree structure representation from the leaf node to a parent root node representing the parent root element, the selected ancestor nodes not including at least one ancestor node of the leaf node located along the path that is uniquely identifiable from at least one first ancestor node of the leaf node located along the path within a scope of a strongly named branch of the hierarchical tree structure representation having a second ancestor node of the leaf node located along the path as the strongly named branch root node, the excluded at least one ancestor node being located between the strongly named branch root node and the at least one first ancestor node along the path, the exposed identifiers associated with the selected ancestor nodes being stored in the identifier represented by the output parameter, the leaf node representing the target user interface element.

12. The computer-readable medium of claim 11, wherein the element path identifier is a string type data structure.

13. The computer-readable medium of claim 11, wherein the element path identifier comprises exposed identifier information of component elements of an element path related to the element of interest.

14. The computer-readable medium of claim 11, wherein the element path identifier comprises class names of component elements of an element path related to the element of interest.

15. The computer-readable medium of claim 11, wherein the element path identifier comprises a module name of an application program related to component elements of an element path related to the element of interest.

16. The computer-readable medium of claim 11, wherein the element path identifier comprises sibling order data.

17. In a computer system running a computer program with a graphical user interface, a system for generating persistent, unique element path identifiers of elements of the graphical user interface and later searching for the elements of the graphical user interface using the element path identifiers, the system comprising:
a memory storing computer-executable instructions, the instructions comprising;
an API module comprising a first set of APIs related to passing function calls for generating the element path identifiers and a second set of APIs related to passing function calls for searching for the elements of the graphical user interface using the element path identifiers; and
an element path engine responsive to the function calls for generating the element path identifiers and to the function calls for searching for the elements of the graphical user interface using the element path identifiers, wherein the element path identifiers comprise information relating to functional ancestor elements and sibling elements of the elements of the graphical user interface such that the element path identifiers persistently and uniquely identify the user interface elements across a build of the computer program, at least one of the element path identifiers comprising exposed identifiers associated with selected ancestor nodes of a leaf node within the a tree structure representation of the graphical user interface, the selected ancestor nodes located along a path of the tree structure representation from the leaf node to a parent root node, the selected ancestor nodes excluding at least one ancestor node of the leaf node located along the path that is uniquely identifiable from at least one first ancestor node of the leaf node located along the path within a scope of a strongly named branch of the hierarchical tree structure representation having a second ancestor node of the leaf node located along the path as the strongly named branch root node, the excluded at least one ancestor node being located between the strongly named branch root node and the at least one first ancestor node along the path, the leaf node representing an element of the graphical user interface; and
a processor for executing the stored instructions.

18. The method of claim 1, wherein persistently and uniquely identifying the user element of interest further comprises persistently and uniquely identifying the user interface element of interest across different builds of the source computer program.

19. The computer-readable medium of claim 6, wherein the output parameter further represents an identifier capable of persistently identifying the target user interface element across different builds of the source computer program.

20. The computer-readable medium of claim 6, wherein the element path identifier identifies the source computer program in which the user interface element resides.

21. The computer-readable medium of claim 6, wherein the element path identifier identifies a user interface platform used to create the user interface element.

22. The computer-readable medium of claim 6, wherein the element path identifier identifies an application frame in which the user interface element resides.

23. A method, comprising:
receiving data indicative of a specified user interface element in a graphical user interface of a computer program; and generating an element path identifier of the specified user interface element, the generating comprising:

locating a leaf node within a tree structure representation of the graphical user interface, the located leaf node representing the specified user interface element;

storing an identifier associated with the located leaf node in an element path identifier data structure; and storing identifiers associated with selected ancestor nodes of the located leaf node located along a path of the tree structure representation from the located leaf node to a designated root node, the selected ancestor nodes excluding at least one ancestor node of the located leaf node located along the path that is uniquely identifiable from at least one first ancestor node of the located leaf node located along the path within a scope of a strongly named branch of the tree structure representation having a second ancestor node of the located leaf node located along the path as the strongly named branch root node, the excluded at least one ancestor node being located between the strongly named branch root node and the at least one first ancestor node along the path, the identifiers associated with the selected ancestor nodes being stored in the element path identifier data structure;

wherein the element path identifier is a composite identifier comprised of the stored identifiers associated with the located leaf node and the stored identifiers associated with the selected ancestor nodes and the element path identifier persistently and uniquely identifies the specified user interface element across reboots of the computer program, across different states of the computer program and across different builds of the computer program.

\* \* \* \* \*

UNITED STATES PATENT AND TRADEMARK OFFICE
CERTIFICATE OF CORRECTION

PATENT NO. : 7,607,110 B2　　　　　　　　　　　　　　　　　　　　　　　　Page 1 of 1
APPLICATION NO. : 10/692923
DATED : October 20, 2009
INVENTOR(S) : McKeon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1240 days.

Signed and Sealed this

Twelfth Day of October, 2010

David J. Kappos
*Director of the United States Patent and Trademark Office*